Jan. 29, 1935.  W. J. ANDRES  1,989,181
BRAKE
Filed Dec. 16, 1931   2 Sheets-Sheet 2
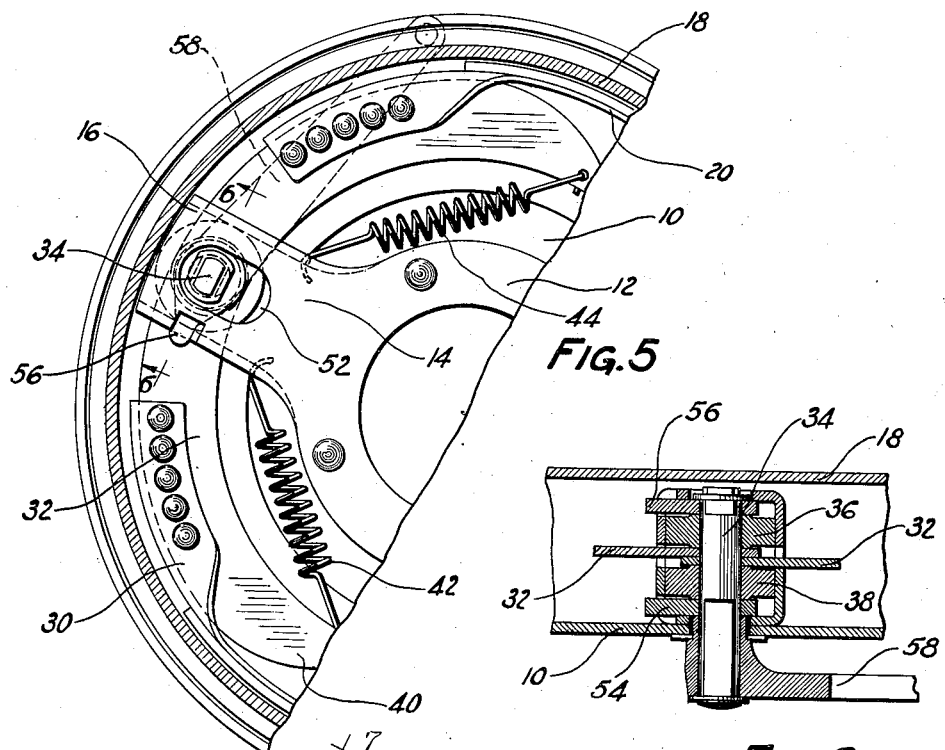
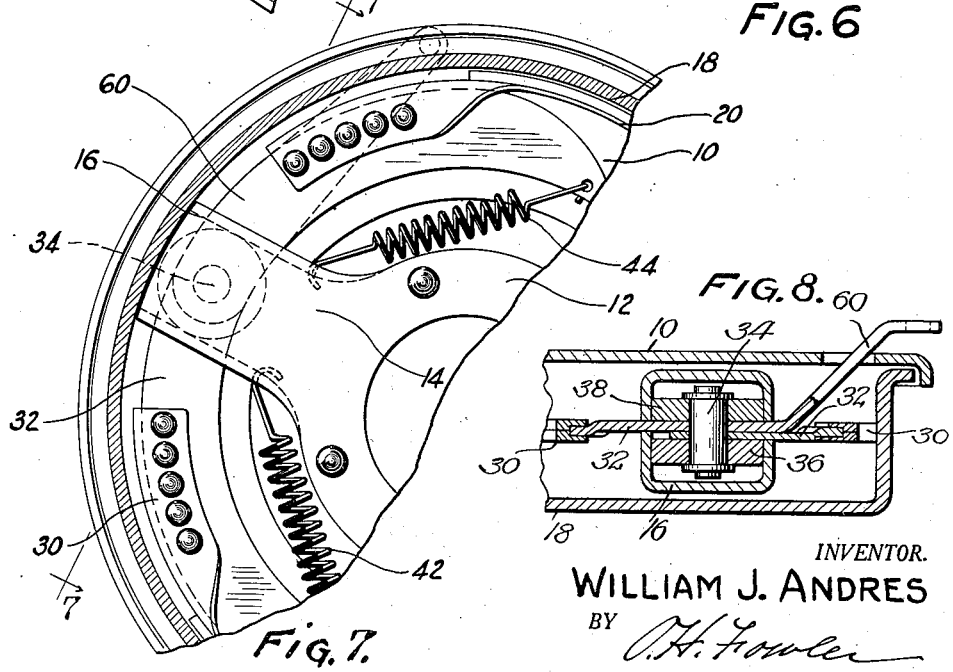
INVENTOR.
WILLIAM J. ANDRES
BY
ATTORNEY.

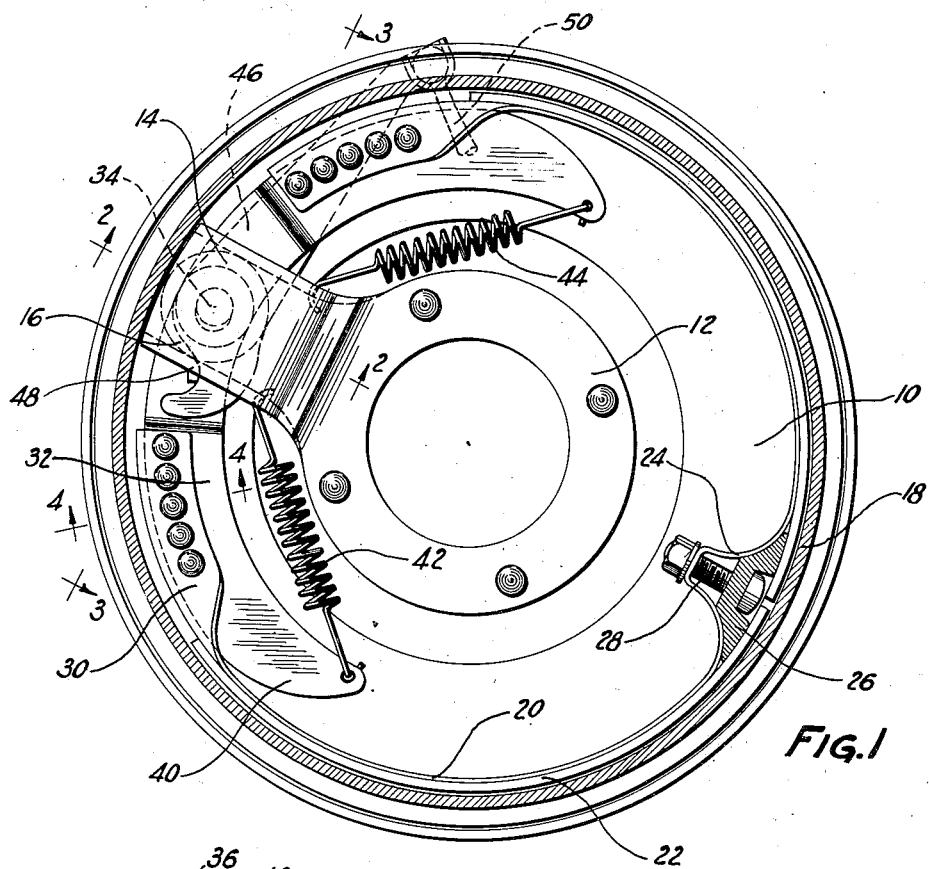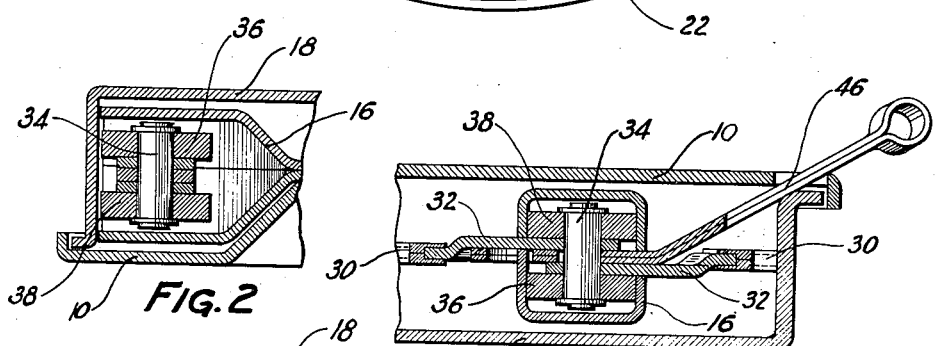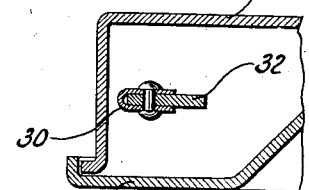

Patented Jan. 29, 1935

1,989,181

UNITED STATES PATENT OFFICE 1,989,181

BRAKE

William J. Andres, South Bend, Ind., assignor to Bendix Aviation Corporation, South Bend, Ind., a corporation of Delaware Application December 16, 1931, Serial No. 581,453

12 Claims. (Cl. 188—78)

This invention relates to brakes and more particularly to internal expanding brakes.

The invention comprehends a combined anchoring and applying means including a toggle connected between the separable ends of the friction element. The toggle has its knee associated with suitable anchoring means arranged to take the torque in either forward or reverse braking.

In one embodiment of the invention the separable ends of a friction element are rigidly connected to the legs of a toggle. The knee of the toggle is positioned in a radial guide and the ends of the legs are tangential to the friction element, so that upon spreading the toggle the friction element is deformed to engage the braking surface of the drum.

As shown, the toggle is actuated by a lever pivoted on the knee of the toggle with its fulcrum on the radial guide and intermediate the length of the friction element is a suitable adjusting device, to adjust the friction element to compensate for wear.

An important object of the invention is to provide a brake structure having means for increasing the effectiveness of the friction element as the application of the applied force progresses.

A salient feature of the invention is a friction element and means for applying the element including means for deforming portions of the element.

Another feature of the invention is a friction element including a split band and means connected between the separable ends of the band including means for deforming the band and means for taking the torque upon application of the brake.

Another feature of the invention is a radially movable anchor and a toggle fulcrumed thereon for actuating the friction elements.

Other objects and features of the invention will appear from the following description taken in connection with the drawings, which form a part of this specification, and in which:

Figure 1 is a vertical sectional view of a brake illustrating the friction element in side elevation;

Figure 2 is a sectional view substantially on line 2—2, Figure 1;

Figure 3 is a sectional view substantially on line 3—3, Figure 1;

Figure 4 is a sectional view substantially on line 4—4, Figure 1;

Figure 5 is a vertical sectional view of a fragment of a brake illustrating a modified form of the invention;

Figure 6 is a sectional view substantially on line 6—6, Figure 5;

Figure 7 is a vertical sectional view of a fragment of a brake illustrating another modified form of the invention; and Figure 8 is a partial sectional view on the line 8—8 of Figure 7.

Referring to the drawings for more specific details of the invention, 10 represents a fixed support such as a backing plate which may be of relatively thin material since no stresses or strains are imposed thereon and its only function is that of a dust shield.

Associated with the backing plate is a fixed support 12 which may be secured to an axle or to a swiveling knuckle, not shown, together with the backing plate. The support 12 has formed thereon a radial torque arm 14 supporting a rectangular housing 16 and associated with the backing plate and support is a rotatable drum 18 which may be secured to a wheel, not shown.

Positioned within the drum and adaptable for cooperation therewith, is a friction element including a single split band 20 having secured thereto a friction lining 22 adapted to engage the face of the drum. As shown, the band has intermediate its length a loop 24 in which is positioned a wedge-shaped member 26 connected by a screw 28 to the band so that upon tightening the screw 28 the band may be adjusted to compensate for wear on the friction lining 22.

The separable ends of the band 20 are deformed to provide channeled sections 30 in which are riveted or otherwise secured corresponding arcuate links 32. These links are connected to the band intermediate their length. The adjacent ends of the links are connected by a pivot 34 having positioned thereon rollers 36 and 38 arranged on opposite sides of the links and adapted to travel on the inner wall of the housing 16. The band anchors at one end or the other, according to the direction the drum is turning, through one or the other of the links 32 and the rollers 36 and 38, the torque being transmitted by the rollers to the stationary housing 16. The rollers in effect constitute a radially movable brake anchor, with the housing as a guide therefor. The band when applied tends to be somewhat of an ellipse, i. e. its opposite sides are bulged outwardly. The other ends of the links have curved surfaces 40 tangential to the inner surface of the band. The free ends of the links 32 are connected by suitable return springs 42 and 44 to the torque arm 14.

Pivoted on the pivot 34 between the links 32 is a lever 46 fulcrumed in the wall of the housing 16 as indicated at 48. The force applying end of this lever is suitably connected through a rod or cable 50 to an operating means, not shown.

A modification of the invention is illustrated in Figure 5. In this modification the pivot pin 34 extends through a suitable opening 52 in the torque taking arm and the backing plate. Suitably secured on the pivot are levers 54 and 56 fulcrumed in the wall of the housing, and the pivot also has suitably secured thereto an operating lever 58. The anchorage, as in the first embodiment, is by engagement of the rollers 36 and 38 with the housing.

A further modification of the invention is illustrated in Figure 7 wherein one of the links 32 is extended as indicated at 60 to provide a lever for spreading the toggle. In this case also the anchorage is by engagement of the rollers with the housing.

In both the preferred and modified forms of the invention when force is applied to the operating lever the friction element is moved bodily through the toggle to engage the drum diametrically opposite the anchor. Upon further application of force the friction element is deformed by the toggle to progressively engage the drum throughout its length.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a friction element including a normally-circular band having separable ends and means for applying the friction element including members rigidly connected to the ends of the band and a pivot directly connecting the ends of said members.

2. A brake comprising a friction element including a band having separable ends and a toggle having its legs rigidly secured to the separable ends.

3. A brake comprising a friction element including a band having separable ends and a toggle having its legs rigidly secured to the ends and means for actuating the toggle.

4. A brake comprising a friction element including a band having separable ends, a toggle having arcuate legs rigidly secured to the separable ends and a lever for actuating the toggle.

5. A brake comprising a friction element having separable ends, a rigid support positioned between the separable ends, a toggle connected between the separable ends and a guide on the support for the knee of the toggle.

6. A brake comprising a friction element having separable ends, a rigid support including a housing positioned between the separable ends, a toggle having arcuate legs rigidly connected to the respective separable ends, the knee of the toggle positioned in the housing and a lever pivoted on the knee of the toggle and fulcrumed on the housing.

7. A brake comprising a fixed support, a radial guide on the fixed support, a member movable in the guide, a pivot on the movable member, a friction element, links on the friction element connected through the pivot and operating means fulcrumed on the pivot.

8. A brake comprising a friction element, and anchor having bodily movement radially of the brake and connected to both ends of said element, and a stationary guide engaged by said anchor.

9. A brake comprising a friction element, an anchor therefor arranged to move bodily radially and an operating lever fulcrumed on the anchor.

10. A brake comprising a friction element having separable ends, a drum cooperating with the friction element, a rigid support, a housing on the support between the separable ends, a toggle connecting the separable ends having its knee positioned within the housing, a lever pivoted on the knee and fulcrumed on the housing.

11. A brake comprising a friction element having separable ends, a drum arranged for cooperation with the friction element, a fixed support, a housing on the fixed support between the separable ends, a toggle connected between the separable ends having its knee positioned within the housing, a lever pivoted to the knee and fulcrumed on the housing and tension members connecting the legs of the toggle to the fixed support.

12. A brake comprising a normally-circular friction element, anchorage means arranged for the ends of the friction element, and means for distorting said element in shape, to apply it, including members rigidly connected to said element and engaging said anchorage means and a pivot directly connecting said members, and applying means acting on said members.

WILLIAM J. ANDRES.